United States Patent
Uebayashi et al.

(10) Patent No.: US 11,378,439 B2
(45) Date of Patent: Jul. 5, 2022

(54) WEIGHT AND FLOW RATE MEASUREMENT DEVICE AND WEIGHT AND FLOW RATE MEASUREMENT METHOD

(71) Applicant: SATAKE CORPORATION, Tokyo (JP)

(72) Inventors: Shigeki Uebayashi, Tokyo (JP); Takeshi Okamoto, Tokyo (JP); Koji Kawakami, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 166 days.

(21) Appl. No.: 16/491,285

(22) PCT Filed: Mar. 5, 2018

(86) PCT No.: PCT/JP2018/008368
§ 371 (c)(1),
(2) Date: Sep. 5, 2019

(87) PCT Pub. No.: WO2018/164064
PCT Pub. Date: Sep. 13, 2018

(65) Prior Publication Data
US 2020/0025604 A1   Jan. 23, 2020

(30) Foreign Application Priority Data

Mar. 10, 2017 (JP) .............................. JP2017-046615

(51) Int. Cl.
*G01G 11/04* (2006.01)
*G01F 1/05* (2006.01)
(Continued)

(52) U.S. Cl.
CPC ............... *G01G 11/04* (2013.01); *G01F 1/05* (2013.01); *G01G 13/247* (2013.01); *G01G 17/06* (2013.01)

(58) Field of Classification Search
CPC ...... G01G 11/04; G01G 13/247; G01G 17/06; G01F 1/05
(Continued)

(56) References Cited

U.S. PATENT DOCUMENTS 3,407,656 A * 10/1968 Chadenson ............... G05F 1/30
                                                                  222/55
3,752,244 A    8/1973 Rouban
(Continued)

FOREIGN PATENT DOCUMENTS

| CN | 1204289 A | 1/1999 |
| CN | 2308083 Y | 2/1999 |

(Continued)

OTHER PUBLICATIONS

The Extended European Search Report dated Oct. 16, 2020 in European Patent Application No. 18764892.8.
(Continued)

*Primary Examiner* — Alexander A Mercado
*Assistant Examiner* — Monica S Young
(74) *Attorney, Agent, or Firm* — Faegre Drinker Biddle & Reath LLP

(57) ABSTRACT

A flow rate measurement device improves the flow rate measurement accuracy without increasing the size of the metering tank. The flow rate measurement device includes a metering tank having a supply port at its upper portion and a discharge port at its lower portion, an on-off valve that opens and closes a flow channel inside the metering tank, a weight measurement unit that measures a weight of the metering tank, and flow rate computing unit that supplies
(Continued)

powders and/or grains continuously from the supply port to the metering tank, computes a flow rate of the powders and/or grains multiple times in a temporally-overlapped state on the basis of the weight of the metering tank measured by the weight measurement unit in a state where the on-off valve is closed, and computes an average flow rate of the powders and/or grains on the basis of the flow rate computed multiple times.

4 Claims, 4 Drawing Sheets

(51) Int. Cl.
*G01G 13/24* (2006.01)
*G01G 17/06* (2006.01)

(58) Field of Classification Search
USPC .......................................................... 73/861
See application file for complete search history.

(56) References Cited

U.S. PATENT DOCUMENTS

| | | | | |
|---|---|---|---|---|
| 3,855,458 A | * | 12/1974 | Motter | G05D 7/0635 |
| | | | | 702/46 |
| 4,944,428 A | * | 7/1990 | Gmur | G01G 13/248 |
| | | | | 222/77 |
| 5,038,973 A | * | 8/1991 | Gmur | G01G 11/18 |
| | | | | 222/56 |
| 5,121,638 A | * | 6/1992 | Gmur | G01G 11/00 |
| | | | | 177/114 |
| 5,148,943 A | * | 9/1992 | Moller | B29C 31/02 |
| | | | | 222/1 |
| 5,178,228 A | * | 1/1993 | Feinland | G01G 23/10 |
| | | | | 177/185 |
| 5,664,699 A | | 9/1997 | Kennedy et al. | |
| 5,753,868 A | * | 5/1998 | Diem | G01G 19/343 |
| | | | | 222/145.5 |
| 5,798,466 A | * | 8/1998 | Satake | G01F 25/10 |
| | | | | 73/861.73 |
| 5,939,681 A | * | 8/1999 | Marshall | G01G 13/02 |
| | | | | 177/118 |
| 6,000,444 A | | 12/1999 | Ishikawa et al. | |
| 10,018,986 B2 | * | 7/2018 | Richard | B65G 47/19 |
| 2005/0145420 A1 | | 7/2005 | Wolfschaffner | |
| 2015/0353293 A1 | * | 12/2015 | Richard | B65G 47/19 |
| | | | | 700/112 |
| 2019/0293479 A1 | * | 9/2019 | Bouchard | G01G 21/23 |

FOREIGN PATENT DOCUMENTS

| | | |
|---|---|---|
| CN | 1585891 A | 2/2005 |
| CN | 101006330 A | 7/2007 |
| CN | 101890760 A | 11/2010 |
| FR | 2146152 A1 | 3/1973 |
| JP | S55-116446 A | 9/1980 |
| JP | S56-145320 A | 11/1981 |
| JP | S58-186019 A | 10/1983 |
| JP | S60-91221 A | 5/1985 |
| JP | S61-017026 A | 1/1986 |
| JP | S61-70735 U | 5/1986 |
| JP | S61-91519 A | 5/1986 |
| JP | S62-502425 A | 9/1987 |
| JP | H04-18614 A | 1/1992 |
| JP | H06-013988 B2 | 2/1994 |
| JP | H07-35603 A | 2/1995 |
| JP | H09-264770 A | 10/1997 |
| WO | WO-97/41411 A1 | 11/1997 |

OTHER PUBLICATIONS

The Notification of the First Office Action dated Sep. 23, 2020 in Chinese Patent Application No. 201880016930.2 (7 pages) with an English translation (10 pages).
Notification to Grant Patent Right dated Feb. 7, 2022 in Chinese Patent Application No. 201880016930.2 (3 pages) with an English translation (3 pages).

* cited by examiner

WEIGHT AND FLOW RATE MEASUREMENT DEVICE AND WEIGHT AND FLOW RATE MEASUREMENT METHOD

CROSS REFERENCE TO PRIOR APPLICATIONS

This application is the National Stage of International Application No. PCT/JP2018/008368 filed Mar. 5, 2018 and claims benefit of Japanese Application No. 2017-046615 filed on Mar. 10, 2017, which are herein incorporated by reference in their entirety.

TECHNICAL FIELD

The present invention relates to a flow rate measurement device and a flow rate measurement method that measure a flow rate of powders and/or grains of cereal grain or the like in a milling facility or the like.

BACKGROUND ART

Traditionally, in order to monitor the status of conveyance of powders and/or grains of cereal grain or the like in a milling facility or the like, it is carried out to arrange a metering tank at a location on a route of conveyance to measure the flow rate of the powders and/or grains (for example, see Patent Literatures 1 and 2).

Patent Literature 1 describes a measuring instrument which arranges and provides a weighing hopper that temporarily holds the powders and/or grains while the powders and/or grains fall and measures the weight of the weighing hopper by a load cell.

Also, Patent Literature 1 describes reading, after a discharge gate provided in the weighing hopper has been closed, a weight value w1 of the weighing hopper at a time t1 and a weight value w2 of the weighing hopper at a time t2; dividing the difference between the weight values (w2−w1) by the difference between the times (t2−t1) to compute an instantaneous flow rate; and determining the flow rate multiple times to compute an average value thereof.

According to the above-described measuring instrument, the measurement accuracy to measure the flow rate can be improved by determining the flow rate multiple times to compute the average flow rate.

However, the measuring instrument opens the discharge gate every time the flow rate is computed and, in a case where the flow rate is determined multiple times and the average flow rate is computed, it is necessary to repeatedly and successively perform multiple rounds of operation to close the discharge gate and hold the powders and/or grains in the weighing hopper, so that a problem arises that the flow of the powders and/or grains have to be suspended for a long period of time.

Meanwhile, Patent Literature 2 describes a flow rate measurement device in which a tubular weighing instrument adapted to temporarily store powders and/or grains is arranged and provided between a supply pipe and a discharge pipe and the weight of the weighing instrument is measured by a pressure sensor.

Also, Patent Literature 2 describes determining an instantaneous flow rate by measuring a weight value AGm of the weighing instrument at a time At and a weight value BGm of the weighing instrument at a time Bt after a slide valve provided at the outlet of the weighing instrument has been closed and dividing the difference between the weight values (BGm−AGm) by the time difference (Bt−At); and determining the flow rate multiple times while the powders and/or grains is stored in the weighing instrument and computing an average flow rate.

According to the above-described flow rate measurement device, since the flow rate can be determined multiple times while the powders and/or grains are stored in the weighing instrument, it is not necessary to repeatedly and successively perform the operations of storing the powders and/or grains in the weighing instrument in order to compute the average flow rate.

However, the flow rate measurement device is configured to determine the flow rates one at a time with time intervals while the powders and/or grains are stored in the weighing instrument, so that a problem arises that the size of the weighing instrument has be increased in a case where the number of rounds of determination of the flow rate should be increased to improve the measurement accuracy of the flow rate.

CITATION LIST

Patent Literature

[Patent Literature 1] Japanese Patent Laid-Open No. 58-186019
[Patent Literature 2] Japanese Patent Publication No. 6-013988

SUMMARY OF INVENTION

Technical Problem

In view of the above, an object of the present invention is to provide a flow rate measurement device and a flow rate measurement method that can improve the flow rate measurement accuracy without increase in the size of the metering tank.

Solution to Problem

In order to achieve the above-identified objective, a flow rate measurement device which is one embodiment of the present invention includes a metering tank having a supply port at its upper portion and a discharge port at its lower portion; an on-off valve that opens and closes a flow channel inside the metering tank; a weight measurement unit that measures a weight of the metering tank; and a flow rate computing unit that supplies powders and/or grains continuously from the supply port to the metering tank, computes a flow rate of the powders and/or grains multiple times in a temporally-overlapped state, wherein the flow rates are computed on the basis of the weight of the metering tank measured by the weight measurement unit in a state where the on-off valve is closed, and computes an average flow rate of the powders and/or grains on the basis of the flow rate computed multiple times.

Here, in the above-described embodiment of the present invention, the flow rate of the powders and/or grains is the weight per unit time of the powders and/or grains supplied to the metering tank.

It is preferable in the flow rate measurement device of the embodiment of the present invention that the flow rate computing unit computes an amount of change in the weight of the metering tank multiple times in a temporally-overlapped state, where the amount of changes is computed on the basis of the weight of the metering tank measured by the weight measurement unit; and computes the flow rate of the powders and/or grains multiple times in a temporally-overlapped state, where the flow rates is computed on the basis of the amount of change in the weight of the metering tank measured multiple times.

According to the flow rate measurement device of the embodiment of the present invention, when the flow rate computing unit computes an amount of change in the weight of the metering tank multiple times in a temporally-overlapped state on the basis of the weight of the metering tank measured by the weight measurement unit; and computes the flow rate of the powders and/or grains multiple times in a temporally-overlapped state on the basis of the amount of change in the weight of the metering tank measured multiple times, then the measurement time for measuring the amount of change in the weight of the metering tank can be extended as compared with a case where the flow rate of the powders and/or grains is computed multiple times without temporal overlapping, in addition to which the number of rounds of the computation of the flow rate of the powders and/or grains can be increased, so that it can improve the flow rate measurement accuracy without increase in the size of the metering tank.

It is preferable in the above-described flow rate measurement device of one embodiment of the present invention that the flow rate computing unit computes an amount of change in the weight of the metering tank at start and end of flow rate measurement on the basis of the weight of the metering tank measured by the weight measurement unit, and computes the amount of change in the weight of the metering tank multiple times in a temporally-overlapped state, the amounts of change being computed on the basis of the flow rate measurements of multiple times where periods of time of the flow rate measurements overlap each other.

According to the flow rate measurement device of the embodiment of the present invention, when the flow rate computing unit computes an amount of change in the weight of the metering tank at start and end of flow rate measurement on the basis of the weight of the metering tank measured by the weight measurement unit, and computes the amount of change in the weight of the metering tank multiple times in a temporally-overlapped state, the amounts of change being computed on the basis of the flow rate measurements of multiple times where periods of time of the flow rate measurements overlap each other, then the flow rate measurement time can be extended as compared with a case where the flow rate of the powders and/or grains is computed multiple times without temporal overlapping, in addition to which the number of rounds of the computation of the amount of change in the weight of the metering tank can be increased, so that it can improve the flow rate measurement accuracy without increase in the size of the metering tank.

It is preferable in the above-described flow rate measurement device of one embodiment of the present invention that the weight measurement unit includes a load cell that supports the metering tank.

It is preferable in the above-described flow rate measurement device of one embodiment of the present invention that the supply port of the metering tank is connected to an upstream pipe and the discharge port of the metering tank is connected to a downstream pipe, the supply and discharge ports being connected to the upstream and downstream pipes, respectively, via a flexible member.

The above-described flow rate measurement device of one embodiment of the present invention includes a frame fixed to the upstream pipe and the downstream pipe, and the load cell is attached to the frame in a cantilever-like manner.

In the above-described flow rate measurement device of one embodiment of the present invention, a long hole is provided in the frame, the long hole extending in a longitudinal direction of the frame, and the load cell is mounted rotatably along the long hole with a support section of the metering tank used as a fulcrum.

Also, in order to achieve the above-identified objective, another embodiment of the present invention is a flow rate measuring method in a flow rate measurement device including a metering tank having a supply port at its upper portion and a discharge port at its lower portion, an on-off valve that opens and closes a flow channel inside the metering tank, and a weight measurement unit that measures a weight of the metering tank, wherein powders and/or grains are supplied continuously from the supply port to the metering tank, a weight of the metering tank is measured by the weight measurement unit at start and end of flow rate measurement in a state where the on-off valve is closed; an amount of change in the weight of the metering tank is computed on the basis of the measured weight of the metering tank; and a flow rate of the powders and/or grains is computed on the basis of the amount of change in the weight of the metering tank, the method including:

carrying out flow rate measurement multiple times such that periods of time of the flow rate measurements overlap each other, the flow rate measurement being carried out multiple times by starting a subsequent flow rate measurement at a time point at which the flow rate measurement is started but is not ended;

computing an amount of change in the weight of the metering tank multiple times in a temporally-overlapped state, wherein the flow rates are computed on the basis of the flow rate measurement carried out multiple times;

computing a flow rate of the powders and/or grains multiple times in a temporally-overlapped state, wherein the flow rates are computed on the basis of the amount of change in the weight of the metering tank measured multiple times; and computing an average flow rate of the powders and/or grains on the basis of the flow rate computed multiple times.

Advantageous Effects of Invention

Since the flow rate measurement device of the present invention includes the flow rate computing unit that continuously supplies the powders and/or grains from the supply port to the metering tank, computes a flow rate of the powders and/or grains multiple times in a temporally-overlapped state on the basis of the weight of the metering tank measured by the weight measurement unit in a state where the on-off valve is closed, and computes an average flow rate of the powders and/or grains on the basis of the flow rate computed multiple times, the number of rounds of the computation of the flow rate of the powders and/or grains can be increased as compared with a case where the flow rate of the powders and/or grains is computed multiple times without temporal overlapping (for example, the flow rate measurement device described in Patent Literature 2), so that it can improve the flow rate measurement accuracy without increase in the size of the metering tank.

Also, since the flow rate measurement method of the present invention starts the subsequent flow rate measurement at a time point after the start but before the end of the flow rate measurement and thereby carries out the flow rate measurement multiple times with the flow rate measurement times overlapping each other; computes an amount of change in the weight of the metering tank multiple times in a temporally-overlapped state on the basis of the flow rate measurement carried out multiple times; computes a flow rate of the powders and/or grains multiple times in a temporally-overlapped state on the basis of the amount of change in the weight of the metering tank measured multiple times; and computes an average flow rate of the powders and/or grains on the basis of the flow rate computed multiple times, the flow rate measurement time can be extended as compared with a case where the flow rate of the powders and/or grains is computed multiple times without temporal overlapping, in addition to which the number of rounds of the computation of the amount of change in the weight of the metering tank can be increased to increase the number of rounds of the computation of the flow rate of the powders and/or grains, so that it can improve the flow rate measurement accuracy without increase in the size of the metering tank.

DESCRIPTION OF EMBODIMENTS

Embodiments of the present invention will be described with reference to the drawings.

Figure 1:
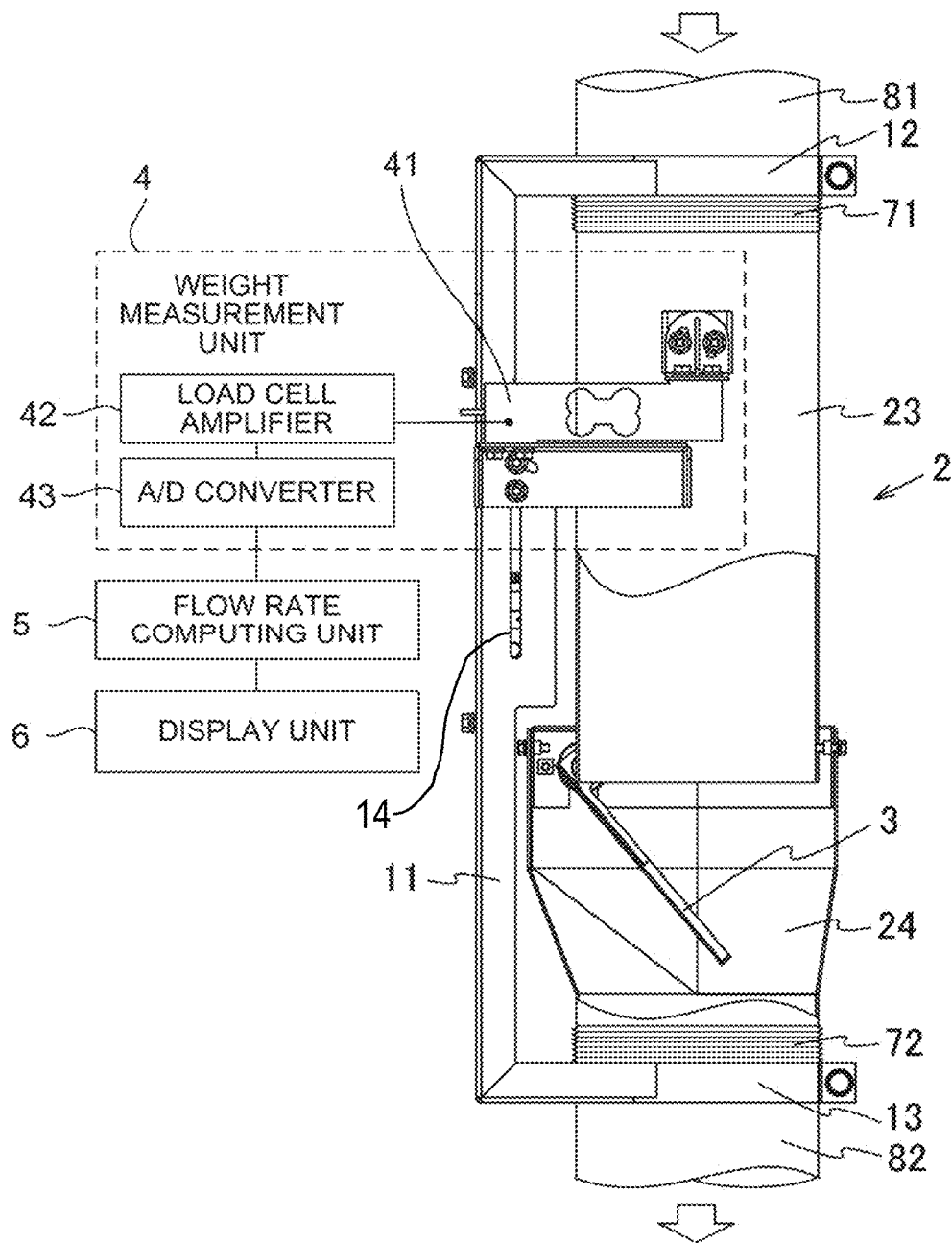
FIG. 1 is a schematic explanatory diagram of a flow rate measurement device in an embodiment of the present invention.
Figure 2:
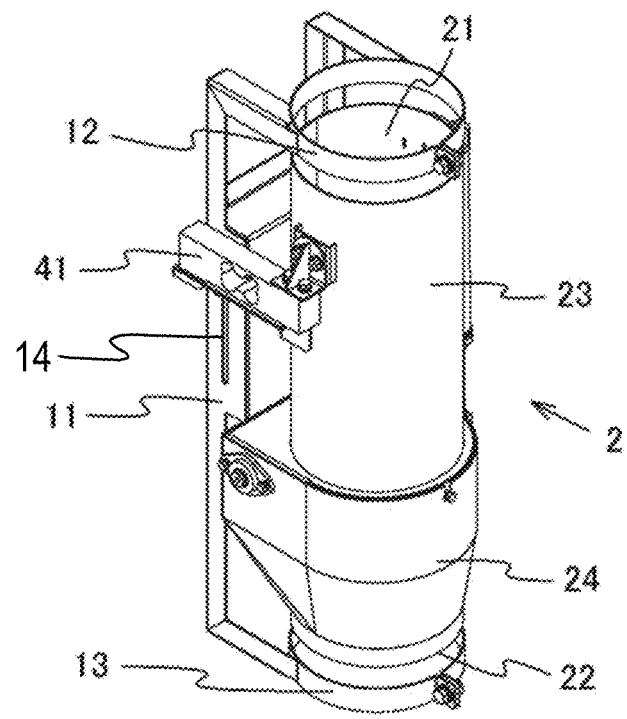
FIG. 2 is a left perspective view of the flow rate measurement device of FIG. 1.
Figure 3:
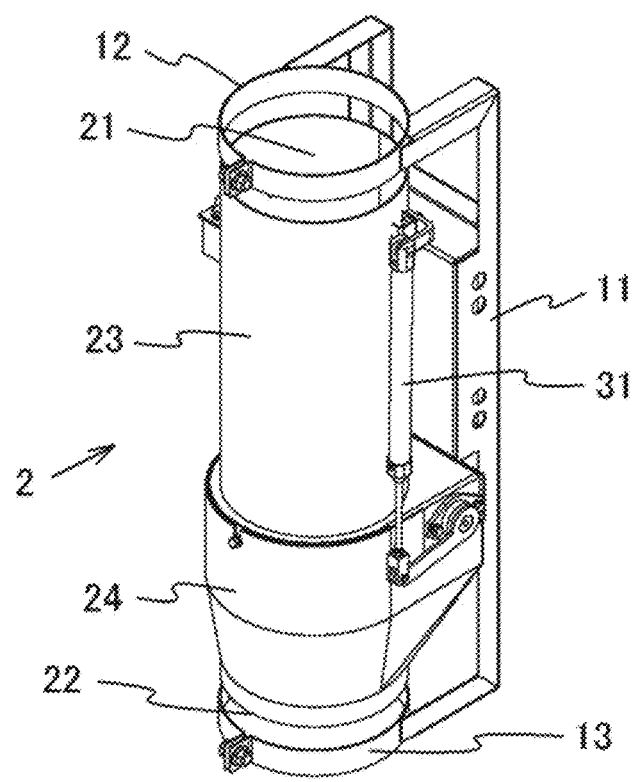
FIG. 3 is a right perspective view of the flow rate measurement device of FIG. 1.
Figure 4:
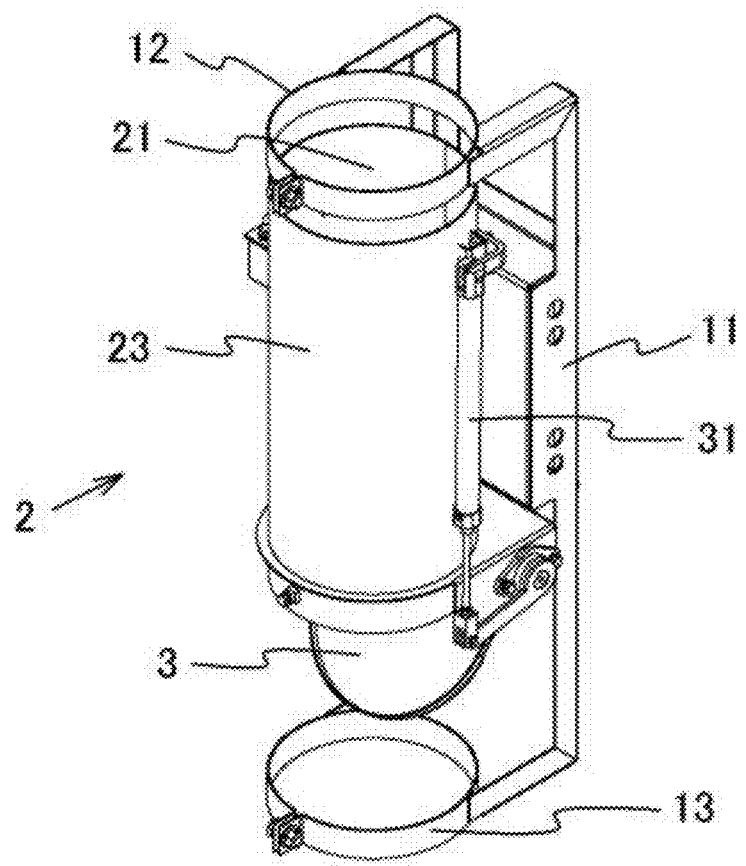
FIG. 4 is an explanatory diagram of the flow rate measurement device of FIG. 3.

FIG. 1 is a schematic explanatory diagram of a flow rate measurement device of an embodiment of the present invention, where the lower half portion of a metering tank is illustrated as a cross-sectional view. FIG. 2 illustrates a left perspective view of the flow rate measurement device of FIG. 1. FIG. 3 illustrates a right perspective view of the flow rate measurement device of FIG. 1. FIG. 4 is an explanatory diagram of the flow rate measurement device of FIG. 3, which illustrates an explanatory diagram where a cover is removed in a state where an on-off valve is opened.

The flow rate measurement device 1 in the embodiment of the present invention includes a metering tank 2 having a supply port 21 at its upper portion and a discharge port 22 at its bottom portion; an on-off valve 3 arranged inside the metering tank 2; a weight measurement unit 4 that measures the weight of the metering tank 2; a flow rate computing unit 5 that computes a flow rate of powders and/or grains on the basis of a weight signal indicative of the weight measured by the weight measurement unit 4; and a display unit 6 that displays the flow rate of the powders and/or grains computed by the flow rate computing unit 5.

The metering tank 2 has a tubular metering pipe 23 and a cover 24 arranged in one piece therewith in a state where it covers the lower end of the metering pipe 23, and the supply port 21 is formed at the upper portion of the metering pipe 23 and the discharge port 22 is formed at the bottom portion of the cover.

Also, the on-off valve 3 is driven to be opened and closed by an air cylinder 31 attached to a side surface of the metering pipe 23, and the flow channel inside the metering tank 2 is opened and closed by opening and closing the lower end opening of the metering pipe 23.

The weight measurement unit 4 includes a load cell 41 that supports the metering tank 2 in a cantilever-like manner, a load cell amplifier 42 that amplifies the weight signal indicative of the weight measured by the load cell 41, and an analog-to-digital (A/D) converter 43 that converts the signal amplified by the load cell amplifier 42 into a digital signal.

Also, the flow rate computing unit 5 is constituted by a microcontroller and configured to compute the flow rate of powders and/or grains using the signal sent from the weight measurement unit 4 as an input signal.

The flow rate measurement device 1 in the embodiment of the present invention further includes a frame 11, where an annular upstream pipe support member 12 is provided at an upper portion of the frame 11 and an annular downstream pipe support member 13 is provided at a lower portion of the frame 11. Also, the load cell 41 is attached in a cantilever-like manner to the frame 11. A long hole 14 is provided in the frame 11 in the longitudinal direction of the frame 11. The load cell 41 uses the support section of the metering tank 2 as a fulcrum and can be displaceably attached along the long hole 14.

The supply port 21 of the metering tank 2 is connected via a flexible member 71 to an upstream pipe 81 supported by the upstream pipe support section 12, and the discharge port 22 of the metering tank 2 is connected via a flexible member 72 to a downstream pipe 82 supported by the downstream pipe support member 13.

In the flow rate measurement device 1 in the embodiment of the present invention, the metering tank 2 is arranged in a pipe in which powders and/or grains of cereal grain or the like are conveyed in a milling facility or the like, where the metering tank 2 is provided as a part of the pipe. In addition, in a situation where the powders and/or grains are conveyed continuously in the pipe, the powders and/or grains are sequentially stored in the metering tank 2 by temporarily closing the on-off valve 3, and the change in the weight of the metering tank 2 is chronologically measured by the load cell 41.

The weight signal indicative of the weight of the metering tank 2 measured by the load cell 41 is input via the load cell amplifier 42 and the A/D converter 43 into the flow rate computing unit 5. In addition, at the flow rate computing unit 5, the amount of change in the weight of the metering tank 2 is computed on the basis of the weight signal of the metering tank 2 measured at the time of start and end of the flow rate measurement by the load cell 4, and the flow rate of the powders and/or grains is computed on the basis of the amount of change in the weight of the metering tank 2.

Here, in the embodiment of the present invention, the weight of the metering tank 2 measured by the load cell 41 includes the weight of the on-off valve 3 and the weight of the air cylinder 31 in addition to the weight of the metering tank 2 as such and the weight of the powders and/or grains stored in the metering tank 2.

Also, in the embodiment of the present invention, since the weight of the metering tank 2 as such, the weight of the on-off valve 3, and the weight of the air cylinder 31 are invariable, the amount of change in the weight of the metering tank 2 computed by the flow rate computing unit 5 is practically the amount of change in the weight of the powders and/or grains stored in the metering tank 2, and the flow rate of the powders and/or grains computed by the flow rate computing unit 5 is the weight of the powders and/or grains supplied to the metering tank 2 per unit time.

Figure 5:
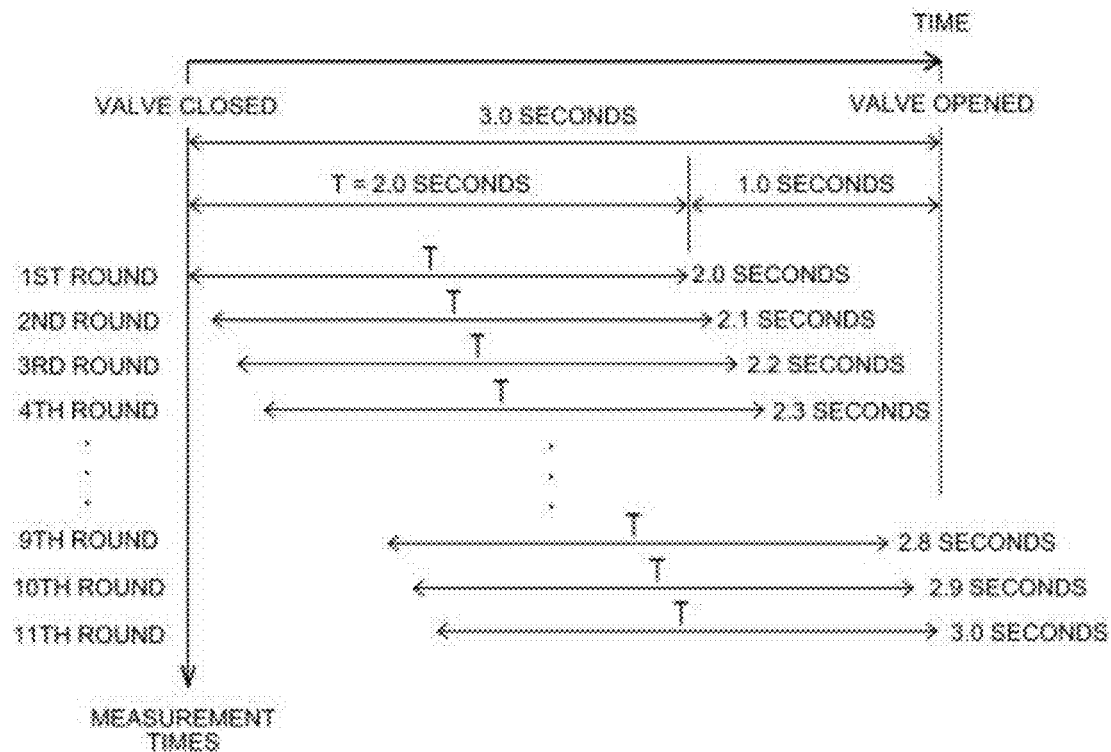
FIG. 5 is a timing chart of flow rate measurement.

FIG. 5 illustrates an example of a timing chart of flow rate measurement in the embodiment of the present invention.

The flow rate measurement device 1 in the embodiment of the present invention is capable of carrying out flow rate measurements in parallel with each other according to a predetermined flow rate measurement time in a temporally-overlapped state.

In the example illustrated in FIG. 5, the period of time during which the on-off valve 3 is closed is set to three seconds, the flow rate measurement time T of one round of measurement is set to two seconds, and the second and subsequent rounds of flow rate measurement are started at a time point of 0.1 seconds after the start of the previous rounds of measurement without waiting for completion of the previous rounds of measurement.

The example of FIG. 5 indicates that, during the three second in which the on-off valve 3 is closed, eleven rounds of the flow rate measurement can be carried out with the flow rate measurement time T set to two seconds.

Figure 6:
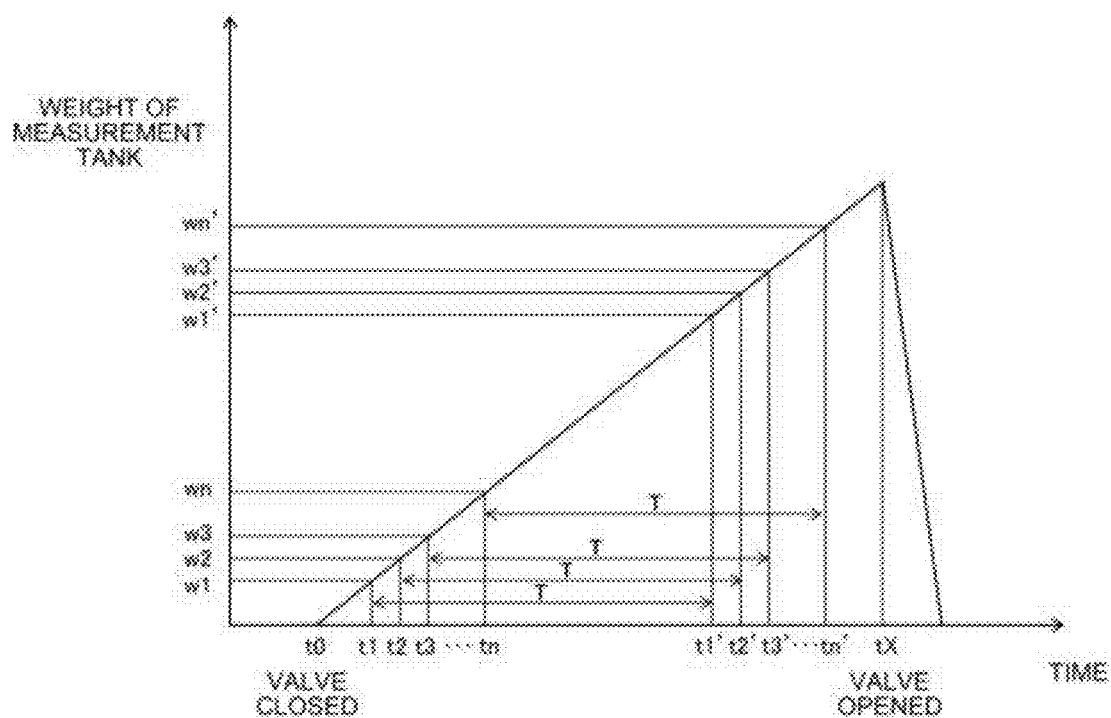
FIG. 6 is a timing chart of change in the weight of a metering tank in the flow rate measurement.

FIG. 6 is a timing chart of the change in the weight of the metering tank, which illustrates an example of a timing chart at the time of the flow rate measurement in the embodiment of the present invention.

FIG. 6 illustrates how the change in the weight of the metering tank 2 takes place in a case where the on-off valve 3 is closed at a time t0 and the on-off valve 3 is opened at a time tX and the on-off valve 3 is closed during the period of time (tX−t0) to temporarily store powders and/or grains in the metering tank 2.

The example of FIG. 6 indicates that: subsequent rounds of the flow rate measurement are sequentially and repeatedly started at the time point after the start of and before the end of their respective previous rounds of the flow rate measurement such that the first round of the flow rate measurement is carried out from the time t1 at which a predetermined period of time elapsed after the on-off valve 3 had been closed to the time t1' at which a predetermined flow rate measurement time T elapsed; the second round of the flow rate measurement by the flow rate measurement time T is started at the time t2 after the first round of the flow rate measurement and before completion thereof; the third round of the flow rate measurement by the flow rate measurement time T is started at the time t3 after the start of the second round of the flow rate measurement but before the end thereof; the flow rate measurements by the predetermined flow rate measurement time T is carried out in parallel with each other in a temporally-overlapped state, and thereby the amount of change in the weight of the metering tank 2 can be computed for "n" rounds; and that the amount of change in the weight of the metering tank 2 computed by n rounds is divided by the flow rate measurement time T and thereby the flow rate of the powders and/or grains can be computed for n rounds in a temporally-overlapped state.

For example, with regard to the flow rate measurement of the n-th round, the flow rate Qn of the powders and/or grains can be computed according to the following expression on the basis of the flow rate measurement time T (tn'−tn) and the amount of change in the weight (wn'−wn) of the metering tank 2:

$$\frac{(wn' - wn)}{(tn' - tn)} \qquad \text{[Math 1]}$$

In the flow rate measurement device 1 in the embodiment of the present invention, in order to monitor the status of the powders and/or grains of the cereal grain or the like being continuously conveyed through a pipe in a milling facility or the like, for example, the on-off valve 3 is closed at intervals of one to three minutes and the measurement of the flow rate of the powders and/or grains is carried out, but during the one to three minutes in which the on-off valve 3 is closed, as illustrated in FIG. 6, by carrying out flow rate measurements in parallel with each other in a temporally-overlapped state, the flow rate of the powders and/or grains can be computed multiple times, so that it is made possible to compute the average flow rate of the powders and/or grains with high measurement accuracy.

It should be noted that in FIGS. 5 and 6, an example has been illustrated where the flow rate measurement is carried out multiple times according to the same flow rate measurement time in a temporally-overlapped state, but it is not always necessary to set the flow rate measurement times to the same one as long as the flow rate measurement is carried out multiple times in a temporally-overlapped state.

In the flow rate measurement device 1 in the embodiment of the present invention, the amount of change in the weight of the metering tank 2 is computed multiple times by the flow rate computing unit 5 in a state where the flow rate measurement times overlap each other on the basis of the weight signal indicative of the weight of the metering tank 2 chronologically measured by the load cell 4 during the one round of work to store the powders and/or grains in the metering tank 2 with the on-off valve 3 closed, and a flow rate of the powders and/or grains is computed multiple times in a temporally-overlapped state on the basis of the amounts of change in the weight of the metering tank 2 computed multiple times, and an average flow rate of the powders and/or grains is computed on the basis of the flow rate computed multiple times.

Accordingly, in accordance with the flow rate measurement device 1 in the embodiment of the present invention, the flow rate measurement time can be extended as compared with a case where the flow rate of the powders and/or grains is computed multiple times without temporal overlapping, in addition to which the number of rounds of the computation of the amount of change in the weight of the metering tank can be increased so as to increase the number of rounds of computation of the flow rate of the powders and/or grains, so that it is made possible to improve the flow rate measurement accuracy without increase in the size of the metering tank.

It will be appreciated that the present invention is not limited to the above-described embodiments and its configuration can be modified as appropriate as long as the range of the invention is not deviated from.

INDUSTRIAL APPLICABILITY

Since the flow rate measurement device of the present invention can improve the flow rate measurement accuracy without increase in the size of the metering tank, it is extremely valuable for practical use.

REFERENCE SIGNS LIST 1 flow rate measurement device
11 frame
12 upstream pipe support member
13 downstream pipe support member
2 metering tank 21 supply port
22 discharge port
23 metering pipe
24 cover
3 on-off valve
31 air cylinder
4 weight measurement unit
41 load cell
42 load cell amplifier
43 A/D converter
5 flow rate computing unit
6 display unit
71 flexible member
72 flexible member
81 upstream pipe
82 downstream pipe

The invention claimed is:

1. A flow rate measurement device comprising: a metering tank having a supply port at its upper portion and a discharge port at its lower portion; an on-off valve that opens and closes a flow channel inside the metering tank; a weight measurement unit that includes a load cell that supports the metering tank, the weight measurement unit repeatedly measuring a weight of the metering tank according to a measurement time in overlapping rounds thereby creating a temporally-overlapped state; and a flow rate computing unit that supplies powders and/or grains continuously from the supply port to the metering tank, computes a flow rate of the powders and/or grains multiple times according to the temporally-overlapped state, wherein the flow rates are computed on the basis of the weight of the metering tank measured by the weight measurement unit in a state where the on-off valve is closed, and computes an average flow rate of the powders and/or grains on the basis of the flow rate computed multiple times, wherein the supply port of the metering tank is connected to an upstream pipe and the discharge port of the metering tank is connected to a downstream pipe, the supply and discharge ports being connected to the upstream and downstream pipes, respectively, via a flexible member, the metering tank includes a frame fixed to the upstream pipe and the downstream pipe, the frame comprising an aperture extending in a longitudinal direction of the frame, and the load cell is mounted displaceably along the aperture with a support section of the metering tank used as a fulcrum, and the load cell is attached to the frame at an extension in parallel with a side surface of the metering tank so as to support the side surface of the metering tank in a cantilever-like manner.

2. The flow rate measurement device according to claim 1, wherein the flow rate computing unit computes an amount of change in the weight of the metering tank multiple times according to the temporally-overlapped state, the amount of changes being computed on the basis of the weight of the metering tank measured by the weight measurement unit; and computes the flow rate of the powders and/or grains multiple times according to the temporally-overlapped state, the flow rates being computed on the basis of the amounts of change in the weight of the metering tank measured multiple times.

3. The flow rate measurement device according to claim 2, wherein the flow rate computing unit computes an amount of change in the weight of the metering tank at start and end of flow rate measurement on the basis of the weight of the metering tank measured by the weight measurement unit, and computes the amount of change in the weight of the metering tank multiple times according to the temporally-overlapped state, the amounts of change being computed on the basis of the flow rate measurements of multiple times where periods of time of the flow rate measurements overlap each other.

4. A flow rate measuring method in a flow rate measurement device including a metering tank having a supply port at its upper portion and a discharge port at its lower portion, an on-oft valve that opens and closes a flow channel inside the metering tank, and a weight measurement unit that includes a load cell that supports the metering tank and measures a weight of the metering tank, wherein powders and/or grains are supplied continuously from the supply port to the metering tank; a weight of the metering tank is measured by the weight measurement unit at start and end of flow rate measurement in a state where the on-off valve is closed; an amount of change in the weight of the metering tank is computed on the basis of the measured weight of the metering tank; and a flow rate of the powders and/or grains is computed on the basis of the amount of change in the weight of the metering tank, the method comprising: carrying out flow rate measurement multiple times such that periods of time of the flow rate measurements overlap each other, the flow rate measurement being carried out multiple times by starting a subsequent flow rate measurement at a time point at which the flow rate measurement is started but is not ended thereby creating a temporally-overlapped state; computing an amount of change in the weight of the metering tank multiple times according to the temporally-overlapped state, wherein the flow rates are computed on the basis of the flow rate measurement carried out multiple times; computing a flow rate of the powders and/or grains multiple times according to the temporally-overlapped state, wherein the flow rates are computed on the basis of the amount of change in the weight of the metering tank measured multiple times; and computing an average flow rate of the powders and/or grains on the basis of the flow rate computed multiple times, wherein the supply port of the metering tank is connected to an upstream pipe and the discharge port of the metering tank is connected to a downstream pipe, the supply and discharge ports being connected to the upstream and downstream pipes, respectively, via a flexible member, the metering tank includes a frame fixed to the upstream pipe and the downstream pipe, the frame comprising an aperture extending in a longitudinal direction of the frame, and the load cell is mounted displaceably along the aperture with a support section of the metering tank used as a fulcrum, and the load cell is attached to the frame at an extension in parallel with a side surface of the metering tank so as to support the side surface of the metering tank in a cantilever-like manner.

* * * * *